(Model.)
M. J. LIDDELL.
SCOOP.
No. 266,849. Patented Oct. 31, 1882.
Fig: 1.
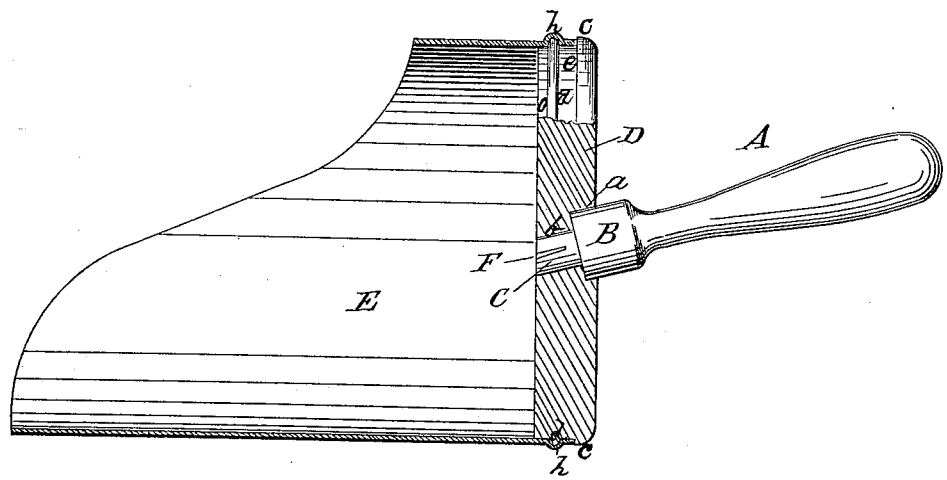
Fig: 2.
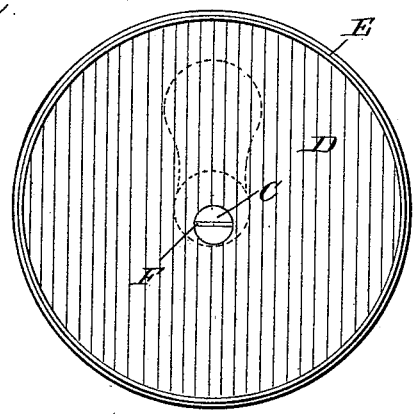
Fig: 3.
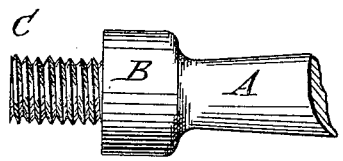
WITNESSES:
Chas. Nida.
C. Sedgwick
INVENTOR:
M. J. Liddell
BY Munn & Co.
ATTORNEYS.

UNITED STATES PATENT OFFICE.

MARK J. LIDDELL, OF EAST SAGINAW, MICHIGAN.

SCOOP.

SPECIFICATION forming part of Letters Patent No. 266,849, dated October 31, 1882.

Application filed September 2, 1882. (Model.)

*To all whom it may concern:*

Be it known that I, MARK JOHN LIDDELL, of East Saginaw, in the county of Saginaw and State of Michigan, have invented certain new and useful Improvements in Scoops, of which the following is a full, clear, and exact description.

My invention relates to improvements in scoops; and it consists in the peculiar construction and arrangement of the parts, as hereinafter more fully set forth, and pointed out in the claims.

Reference is to be had to the accompanying drawings, forming part of this specification, in which similar letters of reference indicate corresponding parts in all the figures.

Figure 1 is a longitudinal sectional elevation of a scoop provided with my improvements. Fig. 2 is a front end elevation of the same. Fig. 3 is a detail view of part of a handle of modified construction.

The wooden handle A is provided at its end with a cylindrical collar, B, from which a pintle, C, of less diameter than the collar B, centrally projects. The head D of the scoop E is provided in its outer surface with a recess, $a$, which extends obliquely partially through the head, and is adapted to receive the collar B at the end of the handle. From the base of the said recess $a$ a smaller aperture, $b$, extends obliquely through the head, and is adapted to receive the pintle C at the end of the handle. The end of the handle is secured in the said recess and aperture by means of a wedge, F, which is driven into the end of the pintle on the inner surface of the head; or the pintle can be screw-threaded, as shown in Fig. 3. In all cases the inner end of the handle is planed or cut off flush with the inner surface of the head. The pintle C gives the handle the desired inclination in relation to the head D, and the collar B gives the handle a firm hold and bearing in the head. The handle can be attached to the head very easily, and the scoop will be strong and durable and of simple construction. The circumference of the head D is provided with the outer and inner circular flanges, $c\,d$, with a space, $e$, between the flanges, and a space, $o$, between the flange $d$ and the inner end of the head D. The end of the hollow body of the scoop E next the head D is made cylindrical in form, and is provided with the circular flange $h$, made hollow interiorly and fitting over the flange $d$. When the inner end of the body E of the scoop is sprung over the head D the inner circular edge of the body E of the scoop abuts against the inner face of the circular flange $c$, whereby the head D is firmly secured to the body E of the scoop.

Having thus described my invention, what I claim as new, and desire to secure by Letters Patent, is—

1. The combination, with the head D, provided with the inclined recess $a$ and smaller inclined aperture $b$, leading therefrom, of the handle A, provided with the cylindrical collar B, inserted in the recess $a$ of the head, and pintle C, inserted in the aperture $b$ of the head and secured therein, substantially as shown and described.

2. The combination, with the hollow body E of the scoop, made cylindrical at its inner end, and provided with the hollow flange or bead $h$, of the head D, provided with the flanges $c\,d$ on its circumference, substantially as shown and described.

MARK JOHN LIDDELL.

Witnesses:
J. L. KELLOGG,
JOHN H. KELLOGG.